United States Patent [19]
Call

[11] 3,881,367
[45] May 6, 1975

[54] INFINITELY VARIABLE RATIO GEAR TRANSMISSION

[76] Inventor: Bernard J. Call, 2201 Walnut Ave., Manhattan Beach, Calif. 90266

[22] Filed: Mar. 18, 1974

[21] Appl. No.: 452,208

[52] U.S. Cl. ................... 74/681; 74/124; 74/125.5
[51] Int. Cl. ........................................... F16h 37/06
[58] Field of Search .................. 74/681, 125.5, 124

[56] References Cited
UNITED STATES PATENTS

| | | | |
|---|---|---|---|
| 1,050,226 | 1/1913 | Nixon | 74/124 X |
| 2,087,562 | 7/1937 | Wallace | 74/124 |
| 3,623,376 | 11/1971 | Call | 74/125.5 |

*Primary Examiner* — Samuel Scott
*Assistant Examiner* — John Reep
*Attorney, Agent, or Firm* — Bernard Kriegel

[57] ABSTRACT

An infinitely variable ratio transmission in which an input shaft drives a pair of continuously engaged gear phases which respectively produce partial rotary motion of an output shaft, the cumulative angular motion of the output shaft being at constant velocity. In each phase, a rotary cam reciprocates a pair of followers and drivers carried thereby which oscillate driven gearing, the latter rotating gearing through one-way clutches to unidirectionally rotate the output shaft. The cams and driving gears of the two phases are out of phase so that the output shaft is driven continuously and at constant velocity. The extent of reciprocation of the drivers is adjustable to vary the transmission ratio from zero to maximum.

20 Claims, 14 Drawing Figures

INFINITELY VARIABLE RATIO GEAR TRANSMISSION

Heretofore, some variable transmission ratio gear drives have involved the shifting of gearing or clutches, the use of fluid couplings or torque converters, relatively shiftable coengaging frictional members, magnetic couplings and intermittent grip mechanisms. The prior transmissions cannot be operated to produce a smooth and predictable variation through mechanical transmission paths between their minimum and maximum transmission ratios, nor do they effect rotation of the output shaft at a uniform angular velocity throughout a variable range of loads.

In my prior U.S. Pat. No. 3,623,376, granted Nov. 30, 1971, there is disclosed a mechanical drive mechanism of infinitely variable transmission ratio, which, for each and every selected transmission ratio, positively rotates the driven or output member at a constant angular velocity, provided the driving member of the transmission is rotating at constant angular velocity.

Such a change speed transmission has advantages in respect of durability, uniformity and ease of operation, allowing, for example, the operation of a power source at constant speed while enabling the infinite variation of the transmission ratio, resulting in the desired output speed.

In accomplishing the foregoing, a plurality, such as a pair of rotary out-of-phase cam drives in which a first cam has its circumference so shaped that in rotation through 180° its cam follower is caused to move in a linear direction at a velocity precisely proportional to the value of the $\sin^2$ function of the angle through which the cam has rotated. A second cam has the same circumferential shape as the first cam, linearly moving its follower in the same manner, but since it leads the first cam by 90°, it is a $\cos^2$ cam. The combined angular velocity imparted by the two cams to the ultimately driven member through the power trains associated with the followers is uniform for all transmission ratios to which the variable speed transmission may be adjusted.

More specifically, that prior transmission provides a pair of rotary cam drives 90° out-of-phase, and which effect reciprocation of racks, the racks and pinions meshing therewith effecting rotation of gears through oppositely working one-way clutches to effect the drive to an output member or shaft, the cumulative output drive being continuous, at a constant velocity, and at a selected ratio.

The present invention relates to variable ratio transmissions, and more particularly to transmissions of the intermittently actuated type in which out-of-phase adjustable drive units drive an output shaft unidirectionally through a differential gear set.

This invention involves such a mechanical transmission which obtains a controllable variable gearing ratio through a continuous range, by virtue of controlling the magnitude of multiphase mechanical rotary strokes. These transmissions use selected mechanical strokes of wave forms which combine to provide a linear relationship between the input and output shafts for any given ratio that is selected within the operating range of the machine. Specifically, this invention provides a mechanical rotary phase generator for such a transmission. The transmission produces $\sin^2$ or $\cos^2$ rotary output rotations or other desireable characteristic mechanical wave forms, adjustable in magnitude and generated from a constant input rotation.

The object of the invention is to provide a transmission which has means enabling rolling line contact between mechanical members which transmit load and impart motion. Hydrostatic bearings or sliding area contact may also be used between the most highly loaded elements. These features provide a high value for mechanical efficiency and provide load paths suitable for high loads.

A further object of this mechanical rotary phase generator is to provide a novel structure in which the critical elements which carry transmission forces are coaxial and are in general supported at their ends. This permits the component parts to be loaded in a pattern that resembles a simple beam, and this results in a transmission structure which is light, strong and stiff.

Another object of this mechanical rotary phase generator is to provide gearing ratio adjustment means which experience a reaction torque proportional to the transmission output torque. This torque value can thus be used as a means of supplying control feedback signals to remote control components, for continuously selecting the transmission gearing ratio.

The present invention provides a transmission of the infinitely variable ratio type as generally referred to above, wherein intermittent motions in each out-of-phase drive mechanism is produced by mechanical members which minimize the frictional coengagement of components as well as minimize deflection of elements, and the ratio of output to input is linear without transients or pulsations in speed, torque or power.

This invention possesses many other advantages, and has other purposes which may be made more clearly apparent from a consideration of the form in which it may be embodied. This form is shown in the drawings accompanying and forming part of the present specification. They will now be described in detail, for the purpose of illustrating the general principals of the invention; but it is to be understood that such detailed descriptions are not to be taken in a limiting sense.

Referring to the drawings.

Figure 1:
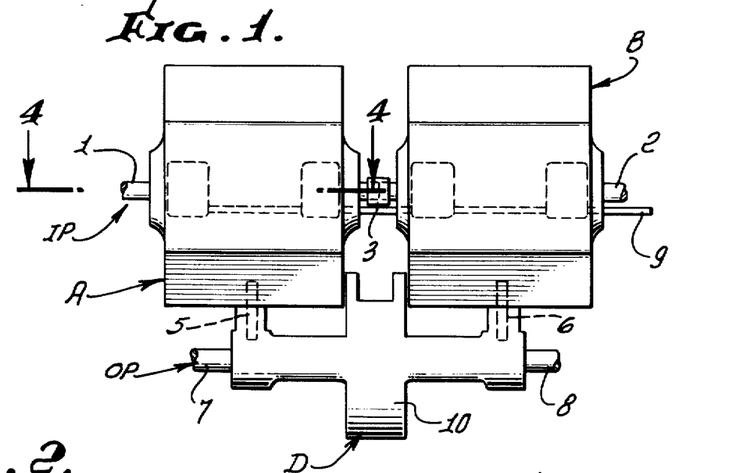
FIG. 1 is an elevation of an infinitely variable ratio gear transmission incorporating the invention.
Figure 2:
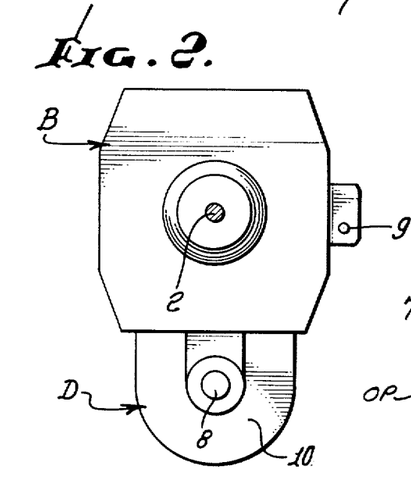
FIG. 2 is an end elevation thereof.

As seen in the drawings referring first to FIG. 1, a transmission assembly comprises a first rotary phase generator mechanism A and a second rotary phase generator mechanism B which are rigidly mounted relative to each other. A common drive shaft IP extends through or between the phases A and B and providing power input locations 1 and 2 at opposite sides of the assembly and an input location 3 between the phases. Output rotation from the phase A mechanism and the phase B mechanism is supplied to the differential gear mechanism D internally by phase output gears 5 and 6 as shown in broken lines, at the points where the housing mount to each other. The differential gear D combines the rotation from the phase A mechanism and the phase B mechanism to supply a transmission output rotation at one or both ends 7 and 8 of an output shaft OP.

Figure 3:
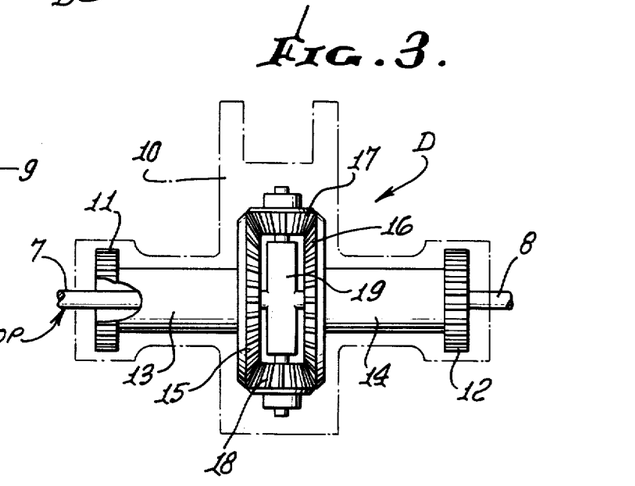
FIG. 3 is a diagrammatic view of the differential gear set.

In a manner to be later described, the rotary phase generators A and B are adapted to produce adjustable mechanical waves to rotate the output gears 5 and 6 which are 90° out-of-phase with respect to rotation of the input shaft IP, and such out-of-phase waves are summed in the differential gear means D to produce constant angular rotation of the output shaft OP. Adjustment of the speed and torque of the output shaft OP between idle or zero and maximum is accomplished by an adjustor shaft 9 which extends through both phase generators A and B to simultaneously adjust them. As seen in FIG. 3, the differential D has within a housing 10 a phase A input gear 11 adapted to be driven by the phase A output gear 5, and a phase B input gear 12 adapted to be driven by the phase B output gear 6. The respective differential input gears 11 and 12 drive hollow shafts 13 and 14 having the bevel gears 15 and 16 engaged with the pinions 17 and 18 of the planetary gear set, these pinions being carried by a support 19 integral with the output shaft OP.

Figure 4:
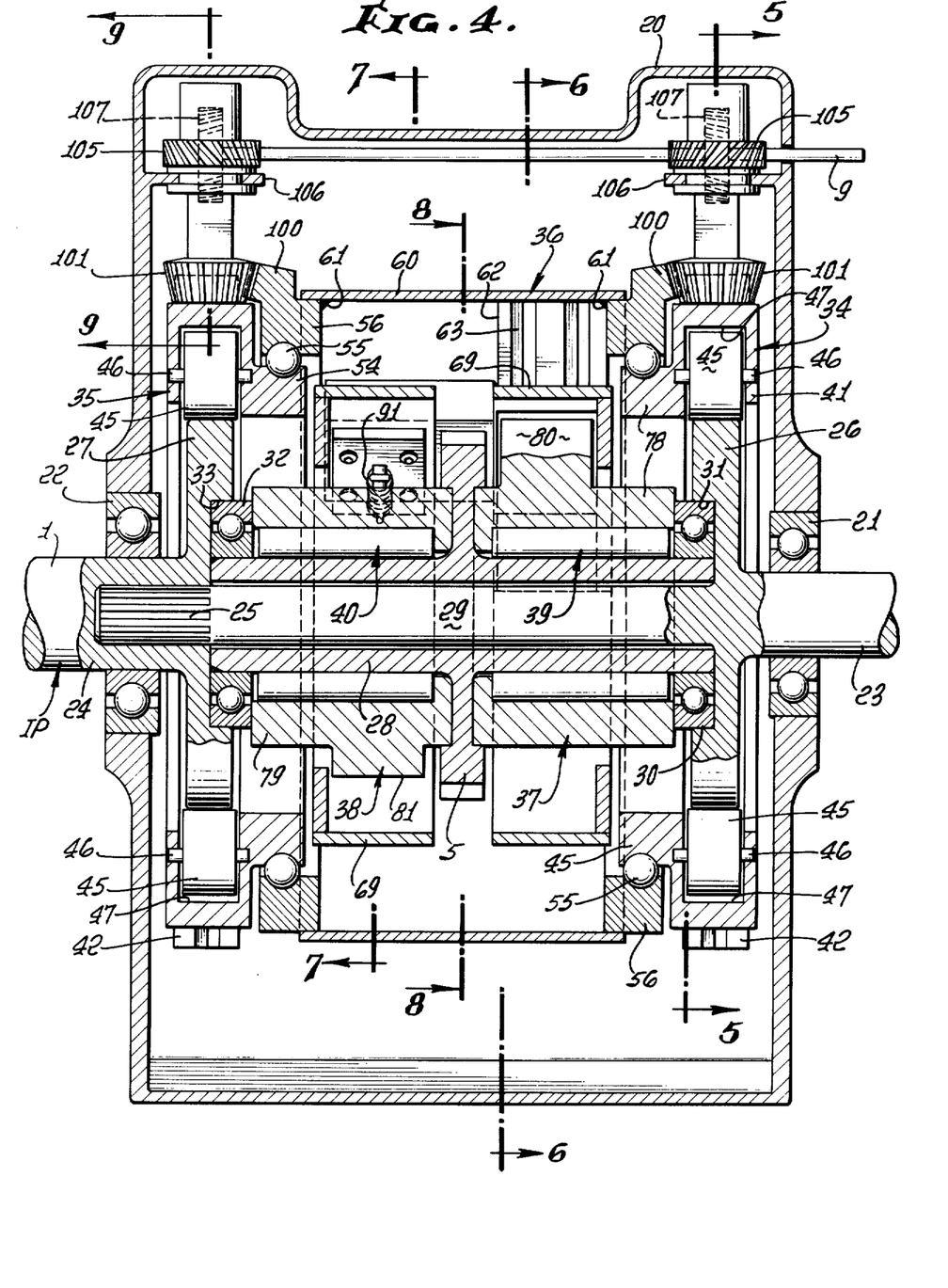
FIG. 4 is a section, as taken on the line 4—4 of FIG. 1, through the rotary phase generator of the power transmission mechanism.
Figure 8:
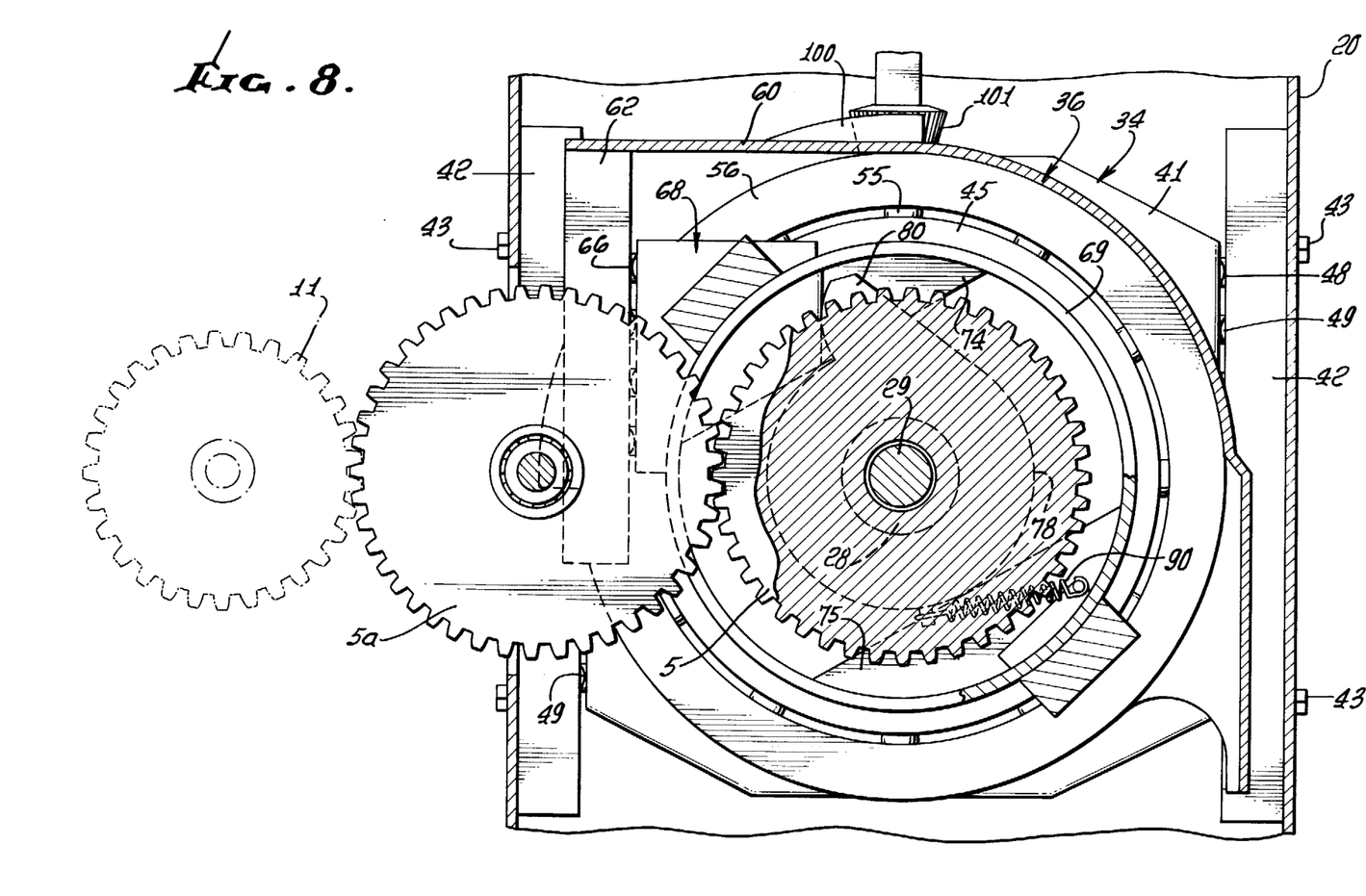
FIG. 8 is a transverse section, as taken on the line 8—8 of FIG. 4, showing the output gearing.

The two phase generators A and B are identical with the exception that they are out-of-phase, say 90° out-of-phase, in the case that the output from the respective wave generators is $\sin^2$ and $\cos^2$ so that the speed and torque of the output shaft OP remains constant throughout the entire range determined by the ratio adjustor shaft 9. The phase A wave generator is shown in FIG. 4 and its related views. The housing or case 20 provides a frame structure supporting anti-friction bearings 21 and 22 at opposite sides thereof and in axial alignment supporting the input shaft IP. In this phase, the input shaft includes a shaft section 23 which is supported in the bearing 21 and extends into another shaft section 24 supported in the bearing 22, the two shaft sections being joined for rotation by a splined connection 25. Formed with or mounted on the shaft section 23 for rotation therewith is a first cam 26, and a corresponding second cam 27 is formed on or made a part of the shaft section 24, the shaft sections being oriented upon assembly so that the cams 26 and 27 are in phase with one another. The output gear 5 of the phase generator is formed on or made part of a hollow shaft 28 which is disposed about the reduced section 29 of the shaft 23 and is rotatably supported in bearings at the ends of the shaft 28. One bearing 30 is mounted in a seat 31 in the inner side of the cam 26, and the other bearing 32 is mounted in a seat 33 in the inner side of the cam 27. Thus, the hollow shaft 28 is mounted for rotation relative to the input shaft IP, as determined by the wave generating means, hereinafter to be described, which are operable to convert rotary motion of the input shaft IP to intermittent rotary motion of the shaft 28. The output gear 5 drives an idler gear 5a (FIG. 8) which in turn drives the differential gear 11 in an intermittent manner determined by adjustment of the adjustor shaft 9 previously referred to.

Figure 5:
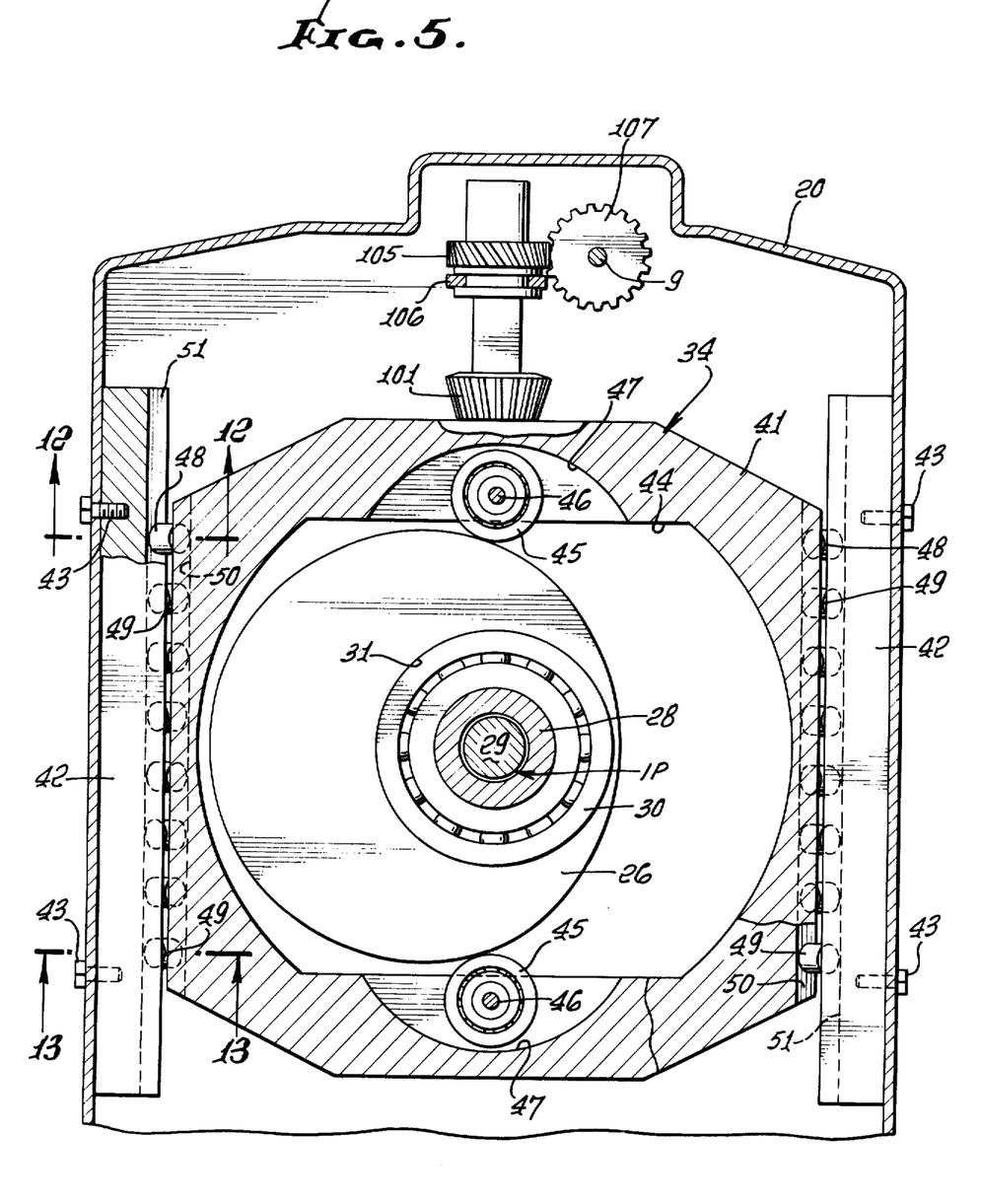
FIG. 5 is a transverse section, as taken on the line 5—5 of FIG. 4, through one of the cams and cam followers.

The cam 26 is adapted to actuate cam follower means 34, as seen in FIG. 5, and the cam 27 is adapted to actuate cam follower means 35 corresponding to the cam follower means 34 so that the description and illustration of the cam follower means 34 is representative of both of the cam follower means 34 and 35. The cam follower means 34 and 35 are adapted to effect reciprocation of adjustable ratio control means 36 which in turn effects angular motion of a pair of 180° out-of-phase gear means 37 and 38, these gear means driving the hollow output shaft 28 through one-way clutch means 39 and 40, respectively.

Figure 12:
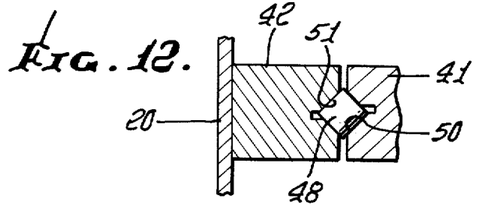
FIG. 12 is a fragmentary detail view in section, as taken on the line 12—12 of FIG. 5.
Figure 13:
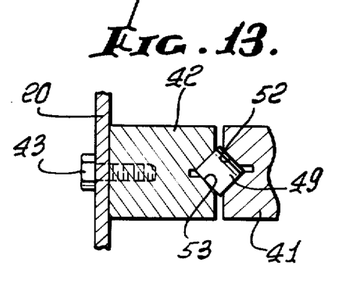
FIG. 13 is a fragmentary detail view in section, as taken on the line 13—13 of FIG. 5.
Figure 14:
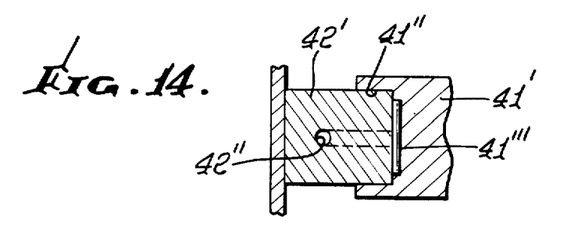
FIG. 14 is a fragmentary detail view in section, corresponding to FIG. 13, but showing a modified construction.

Referring to FIGS. 4 and 5, the cam follower means 34 is shown as comprising a slide 41 mounted for linear reciprocation within the housing 20 between laterally spaced slide supports 42, 42 suitably affixed to the side walls of the housing 20 as by fasteners 43. The slide 41 has an elongated opening 44 in which the cam 26 is revolvable, and at locations spaced diametrically with respect to the axis of the shafts 28 and 29 is a pair of cam follower rollers 45, 45 in the form of roller bearing assemblies mounted on supporting pins or shafts 46, 46 which span arcuate cavities 47 formed in the slide 41 and receiving the rollers. The slide 41 is constrained against movement except in a direction induced by the cam profile by means of rollers 48 and 49 which are interposed between the opposing side edges of the slide 41 and the fixed slide supports 42. As seen in FIGS. 12 and 13, the slide 41 has a V-shaped groove providing a roller engaging wall 50 opposed to a roller engaging wall 51 provided in the respective slide supports 42, with the rollers 48 rollingly engaged with the surfaces 50 and 51. The alternate rollers 49 are rotatable on axes turned 90° with respect to the rollers 48 and rollingly engageable with opposed surfaces 52 and 53 on the slide 49 and the fixed slide supports 52. In this manner the slide 41 is supported against cocking between the fixed slide supports 42. Such linear bearing assemblies are well known and are commercially available from Bendix Industrial Tools Division. In FIG. 14 a slightly modified construction is shown wherein the slide 41' and the fixed slide supports 42' define a fluid bearing, the slide 41' receiving between laterally spaced confining walls 41'' the inner edge portion of the fixed slide support 42'. Fluid is supplied to an inner bearing 41''' at the inner surface of the slide support 42' via a fluid inlet port 42''.

The profile of the cam 26, and correspondingly the cam 27 and its associated cam follower slide 45, is selected to reciprocate the slide 41 in any wave form that may be required by the transmission and, a typical example of the wave form would be a sin² value for velocity magnitude with respect to the rotation angle, wherein the positive value of the velocity is always taken to be in the direction of motion. In all cases the diametrical distance across the cam should be selected to maintain contact with both of the cam follower rollers 45 simultaneously and continuously throughout the entire cam rotation and without creating binding between the cam and the cam follower rollers.

Figure 6:
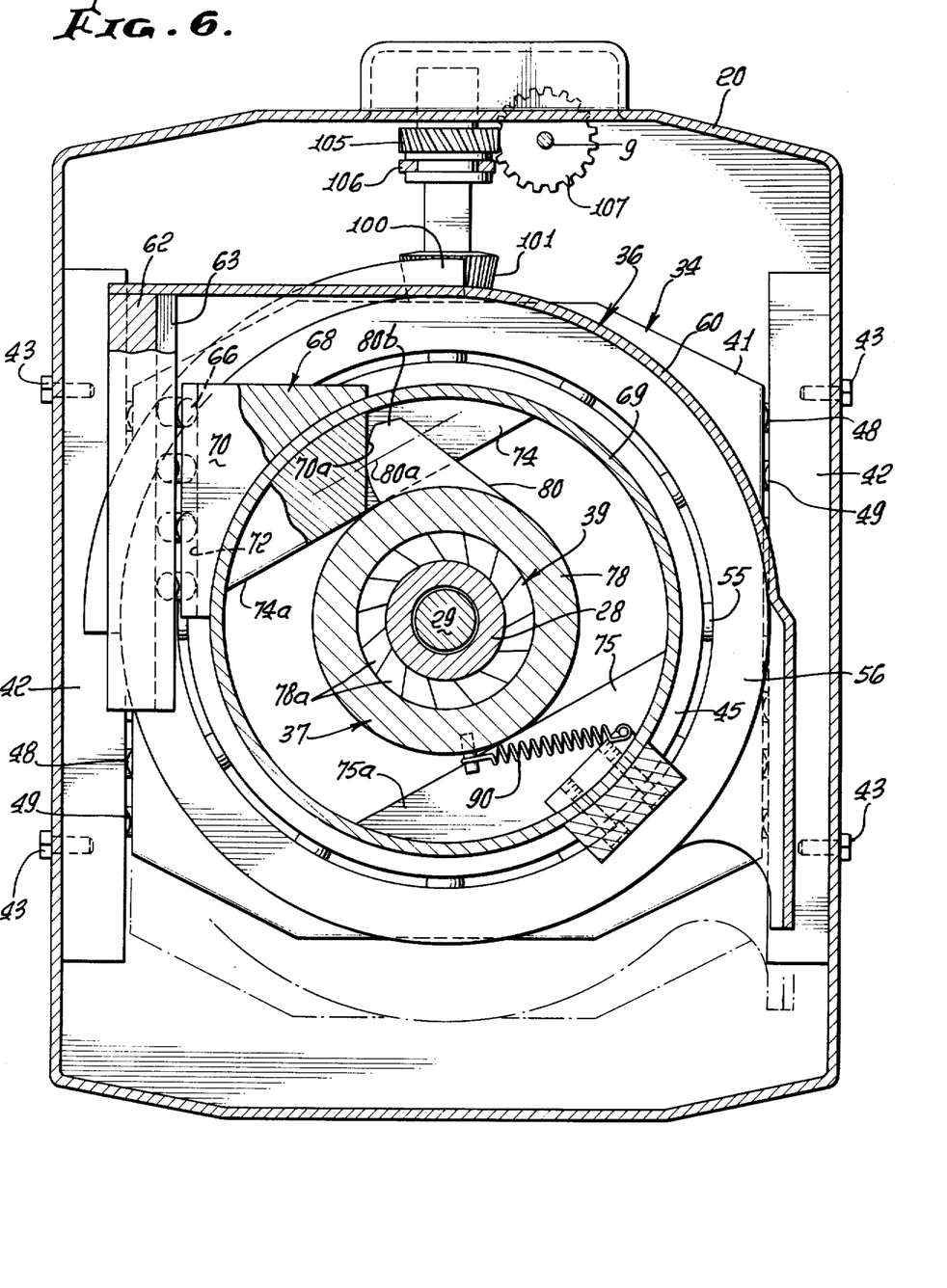
FIG. 6 is a transverse section, as taken on the line 6—6 of FIG. 4, showing one of the driven members and the driving member in a neutral condition.
Figure 7:
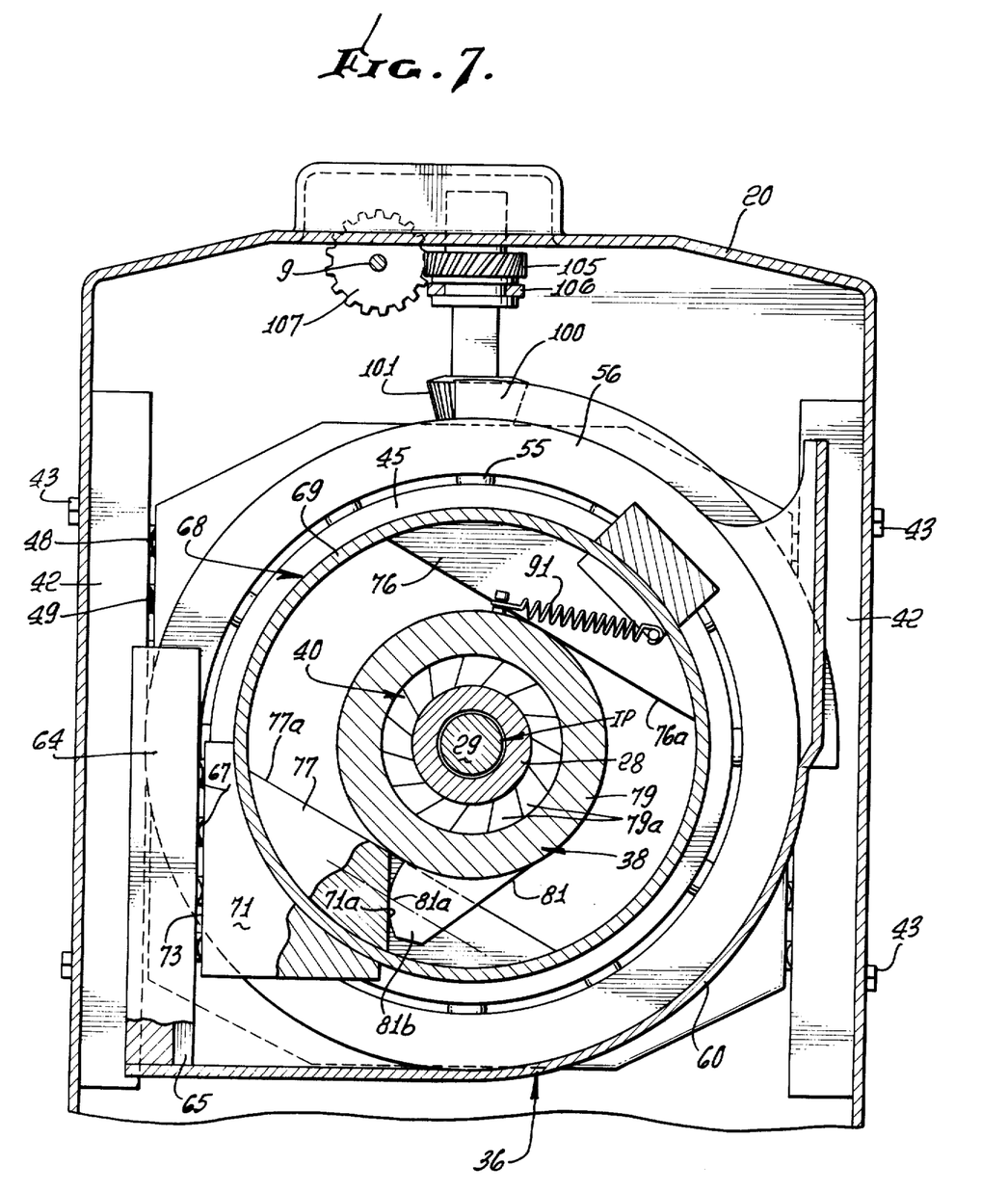
FIG. 7 is a transverse section, as taken on the line 7—7 of FIG. 4, showing the other driven member and driving member in a neutral condition.

As best seen in FIG. 4, each of the slides 41 of the cam follower means has an inner annular flange 54 constituting an inner bearing race receiving ball bearings 55, and an outer bearing ring or race 56 is revolvably mounted about the race 54 in the bearing 55. Referring to FIGS. 4, 6, and 7, it will be seen that the ratio control means 36 includes an arcuate plate 60 ridigly connected to the outer bearing races 56, as by welding at 61, and spanning the outer bearing races 56 so as to be rotatable therewith as will be later described, to effect adjustment of the phase generating unit. This plate 60 carries a control guide or support 62 having a roller bearing race 63, as seen in FIG. 6, and a similar guide or support 64 having a roller race 65, as seen in FIG. 7, extending in opposite directions and supporting on rollers 66 and 67 an angularly adjustable rack or driver assembly generally denoted at 68 comprising a tubular support structure 69 having a pair of rack members 70 (FIG. 6) and 71 (FIG. 7) respectively having bearing races 72 and 73 receiving the roller bearings 66 and 67. These bearing assemblies are like the linear bearings previously described. The driver assembly 68 is adjusted angularly in response to angular adjustment of the plate 60 when the bearing races 56 are angularly adjusted, as will be later described. The tubular structure 69 includes chordal internal guide members 74, 75 (FIG. 6) and 76, 77 (FIG. 7) respectively engaged with the hubs 78 and 79 of driven gear members 80 and 81 of the gear means 37 and 38. These guide members 74 through 77 provide surfaces 74a, 75a and 76a and 77a, whereby the rack structure is caused to move in the bearings 66 and 67, upon angular adjustment of the plate 60 so as to adjust the pitch lines 80a and 81a with respect to an involute gear tooth 80b and 81b in the respective gears 80 and 81. The rack faces 70a and 71a of the respective racks 70 and 71 which engage the gear tooth are parallel and in opposed relation at opposite sides of the axis of rotation of the output shaft section 28, with the teeth 80b and 81b facing in opposite directions in confronting relation with the rack surfaces 70a and 71a. The hubs 78 and 79 of the gears 80 and 81 contain the one way clutch means 39 (FIG. 6) and 40 (FIG. 7) for driving the output shaft 20. The clutches 39 and 40 include clutch elements 78a and 79a of any typical type adapted to produce a one way clutching action between the respective hubs 77 and 79 and the shaft 28, while enabling over-running of the shaft 28 in the other direction. Such one way clutches are well known and a typical type is the "SPRAG" clutches of Borg-Warner Corporation. The hub 78 of the gear 80 has spring means 90 biasing the gear 80 in a counterclockwise direction as viewed in FIG. 6, and a tension spring 91 tends to rotate the hub 79 of the gear 81 in a clockwise direction as viewed in FIG. 7, the spring accordingly biasing the gear teeth 80b and 80b towards the rack faces 70a and 71a. The one-way clutch elements 78a and 79a are adapted to prevent rotation of the hubs 78 and 79 in the other direction relative to the shaft 28, so that when the rack faces 70a and 71a are adjusted through a range of angles relative to the gears, the gears will be caused to move arcuately to opposite directions corresponding in amounts to the opposite phases of reciprocation of the racks 70 and 71 under the influence of the cams 26 and 27, to intermittently cause unidirectional rotational of the shaft 28.

Figures 9, 10:
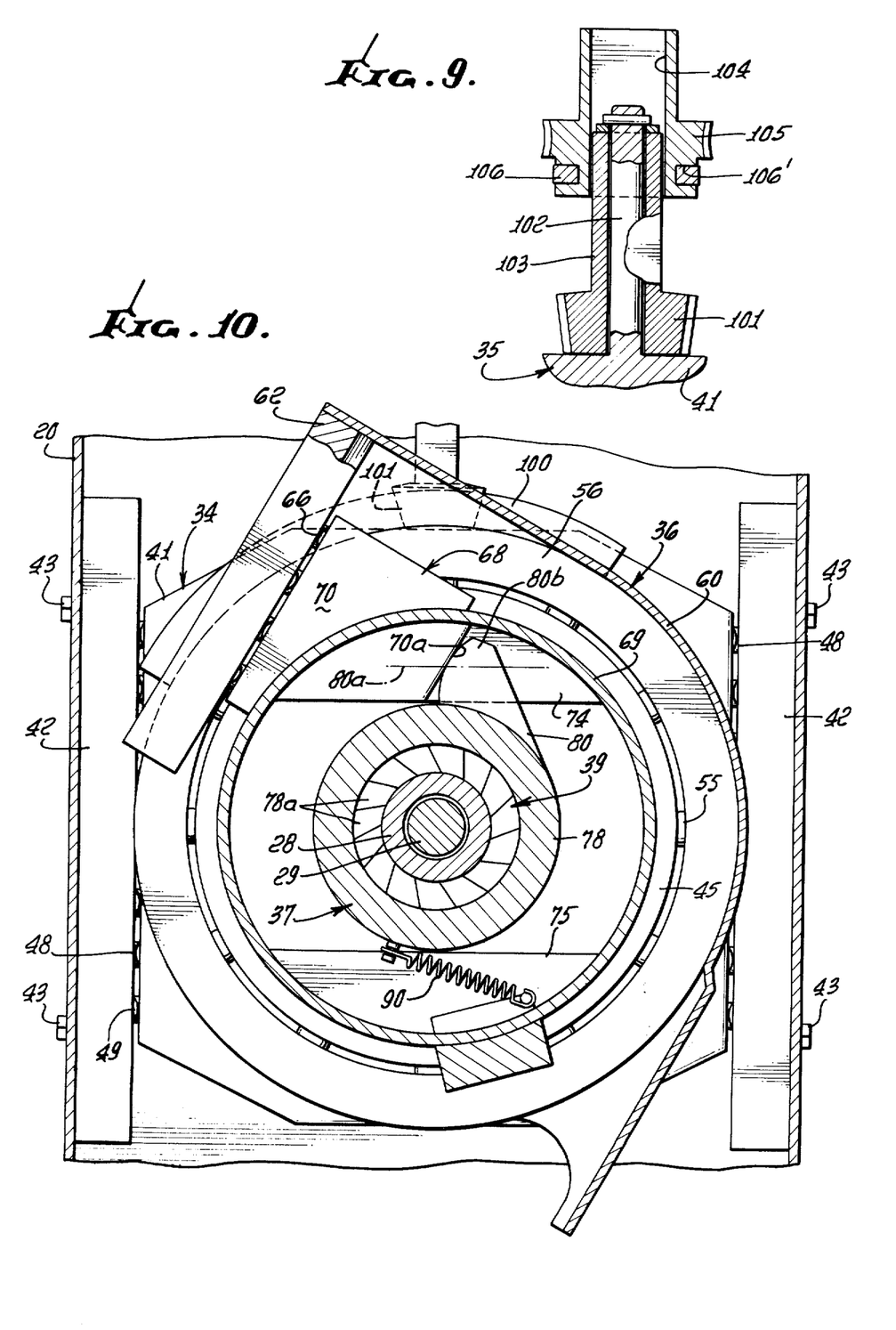
FIG. 9 is a fragmentary detail view in section as taken on the line 9—9 of FIG. 4, showing the ratio adjustor mechanism.
FIG. 10 is a view corresponding to FIG. 6, but showing the driving member adjusted to effect rotation of the driven member at an intermediate drive ratio.
Figure 11:
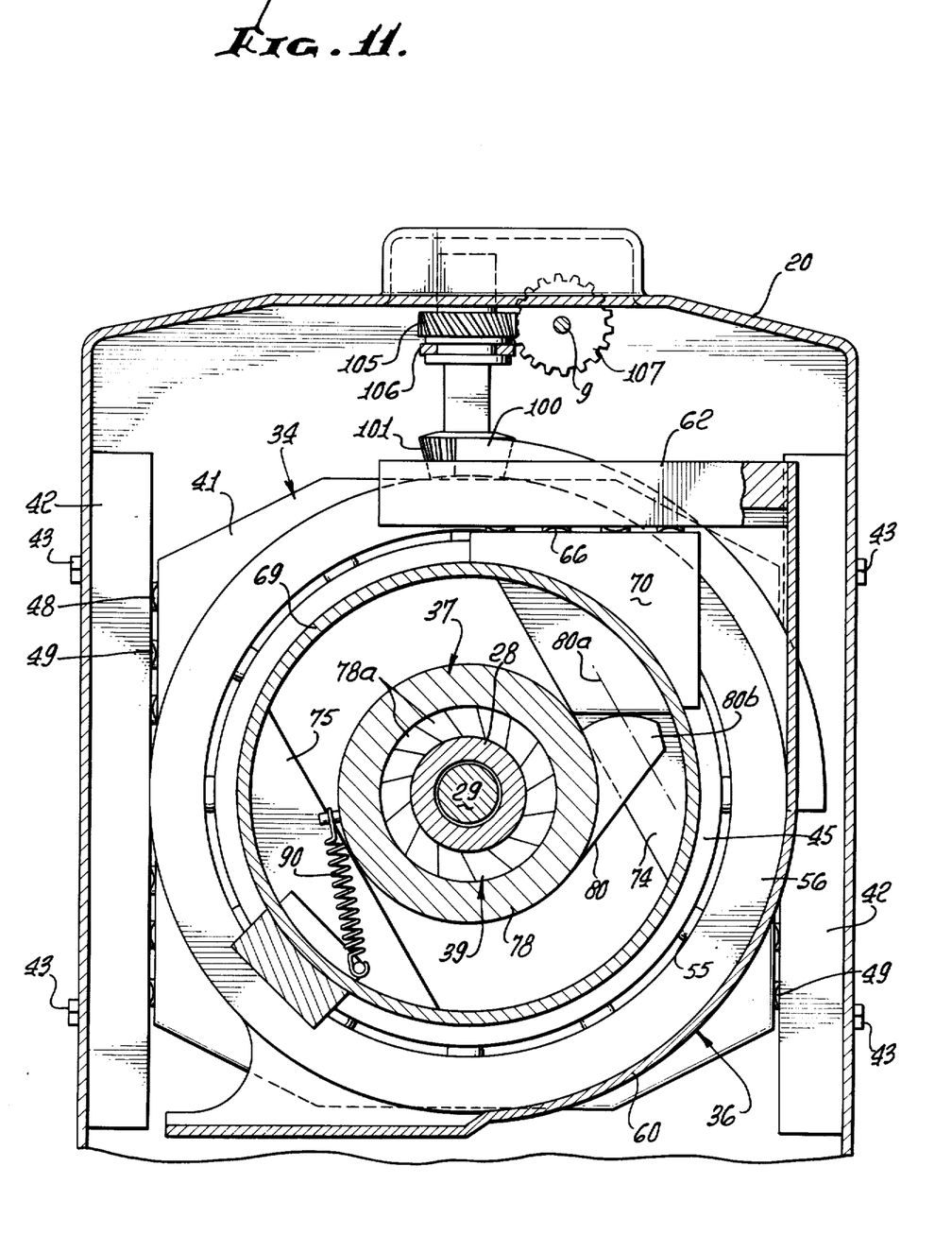
FIG. 11 is a further view corresponding to FIG. 6, but showing the driving member adjusted to drive the driven member in the maximum ratio.

Such angular adjustment of the racks 70 and 71 is effected by the shaft 9 previously referred to and adjustment of the rack 70 to two selected positions is shown in FIGS. 10 and 11. In FIG. 6, the apparatus is adjusted in such a manner that the rack 70 remains stationary, so that no motion is imparted by its rack surface 70a to the gear tooth 80b. In FIG. 10, the rack 70 has been angularly adjusted to have a positive 30° angle with respect to the gear tooth 80b, whereby to produce an increment of angular motion during downward movement of the rack 70 with respect to the gear tooth 80b in response to one cycle of the cams 26 and 27 which will effect vertical reciprocation of the cam followers 34 and 35, as well as the rack supporting plate 60 of the ratio control means 36. In FIG. 11, the rack 70 is shown as being adjusted to produce maximum stroke or motion of the gear 80b in response to each cycle of the cams. It will be understood that when the rack 70 is adjusted to the selected positions of FIGS. 10 and 11, the other rack 71 is correspondingly adjusted to produce an increment of motion of the other gear in each cycle of the cams.

In order to effect the angular adjustment of the ratio control means by manipulation of the shaft 9, it will be seen that each of the outer rings or bearing races 56 of the ratio control means 36 has a segment of a gear 100 thereon which is in mesh with a pinion 101 mounted on the respective cam followers 34 and 35, as best seen in FIG. 9. Each pinion 101 is mounted for rotation about a supporting shaft 102 projecting outwardly from the follower plate 41, the pinion having a non-circular, or square, exterior slidable within a companion opening 104 within the hub of a helical gear 105 for driving the pinion 101. Gears 105 for driving the respective pinions 101 are suitably supported on brackets 106 which extend inwardly from the sides of the housing 20 and engage in a groove 106' in the hub of the gears 105. Driven by the adjuster shaft 9 and in mesh with the helical gears 105 is a pair of mating gears 107. Since it is desired that the ratio control means be angularly adjusted by driving the pinions 101 in opposite directions, the adjuster gears 105, 107 are of opposite lead. It will be noted that the reaction from the gear segments 100 is taken by the adjuster means through the pinions 101, and reaction torque through the gears 105, 107 of the adjuster means will be transmitted to the shaft 9 in proportion to the gearing, so that if desired the reaction torque signal may be utilized to provide a control function as previously indicated.

It will now be appreciated that the phase generating mechanism A will produce angular motion of the output shaft OP during rotation of its cams, and that the phase generating apparatus of the phase generator B will produce angular motion of the output shaft OP during its phase of operation, and that where the sum of these motions equals a constant, the output shaft motion will be constant as described above.

I claim:

1. In an angular motion phase generator for an infinitely variable change speed transmission having two phase generators for driving a summing differential: a frame, a power input shaft journalled in said frame, a power output shaft, first and second cams in phase with one another and rotatable with said input shaft, adjustable ratio control means reciprocable by said cams and including opposed drive members having oppositely facing parallel drive surfaces at opposite sides of said output shaft, first and second driven gear means in out-of-phase relationship, one way clutch means unidirectionally connecting said gear means to said output shaft for driving the same, said gear means being engaged by said drive surfaces, and said ratio control means including means for angularly adjusting said drive surfaces with respect to said gear means to vary the ratio of input to output motion caused by reciprocation of said ratio control means.

2. In an angular motion phase generator as defined in claim 1, said means for angularly adjusting said drive surfaces including means connected with said frame to anchor said ratio control means against rotation.

3. In an angular motion phase generator as defined in claim 1, cam follower means interposed between each of said cam means and said ratio control means, linear bearing means mounting said cam follower means in said frame, and means mounting said ratio control means in said cam follower means for angular adjustment of said ratio control means.

4. In an angular motion phase generator as defined in claim 3, said linear bearing means including opposed races having rollers alternately revolvable about axes offset 90°.

5. In an angular motion phase generator as defined in claim 3, said linear bearing means including relatively reciprocable members having laterally spaced walls on one member receiving the other member and defining therewith a fluid bearing space, and one of said members having an inlet for bearing fluid.

6. In an angular motion phase generator as defined in claim 1, said frame having opposed side walls, bearings supporting said input shaft in said side walls, said output shaft being hollow an disposed about said input shaft, and bearings supporting said output shaft about said input shaft at opposite ends of said output shaft.

7. In an angular motion phase generator as defined in claim 1, said frame having opposed side walls, bearings supporting said input shaft in said side walls, said output shaft being hollow and disposed about said input shaft, and bearings supporting said output shaft about said input shaft at opposite ends of said output shaft, said output shaft having a central output gear thereon and said first and second driven gear means being disposed on opposite sides of said output gear.

8. In an angular motion phase generator as defined in claim 1, said frame having opposed side walls, bearings supporting said input shaft in said side walls, said output shaft being hollow and disposed about said input shaft, and bearings supporting said output shaft about said input shaft at opposite ends of said output shaft, said output shaft having a central output gear thereon and said first and second driven gear means being disposed on opposite sides of said output gear, said first and second driven gear means having hubs disposed about said output shaft, and said one way clutch means being disposed between said hubs and said output shaft.

9. In an angular motion phase generator as defined in claim 1, cam follower means interposed between each of said cam means and said ratio control means and including a slide, linear bearing means mounting said slide for reciprocating movement with respect to said input shaft, said slide having cam follower rollers rotatably mounted for rotation at opposite sides of said input shaft, said cam being interposed between said rollers.

10. In an angular motion phase generator as defined in claim 1, cam follower means interposed between each of said cam means and said ratio control means and including a slide, linear bearing means mounting said slide for reciprocating movement with respect to said input shaft, said slide having cam follower rollers rotatably mounted for rotation at opposite sides of said input shaft, said cam being interposed between said rollers and having a profile in contact with said rollers throughout rotation of said cam.

11. In an angular motion phase generator as defined in claim 1, cam follower means interposed between each of said cam means and said ratio control means and including a slide, linear bearing means mounting said slide for reciprocating movement with respect to said input shaft, said slide having cam follower rollers rotatably mounted for rotation at opposite sides of said input shaft, said cam being interposed between said rollers, and said means for angularly adjusting said drive surfaces with respect to said gear means including a pair of segmental gears, one of said segmental gears being rotatably mounted on the respective slides and being connected with said ratio control means, a pair of pinion gears rotatably supported on each of said slides, and adjustor means for simultaneously driving said pinion gears.

12. In an angular motion phase generator as defined in claim 1, cam follower means interposed between each of said cam means and said ratio control means and including a slide, linear bearing means mounting said slide for reciprocating movement with respect to said input shaft, said slide having cam follower rollers rotatably mounted for rotation at opposite sides of said input shaft, said cam being interposed between said rollers, and said means for angularly adjusting said drive surfaces with respect to said gear means including a pair of segmental gears, one of said segmental gears being rotatably mounted on the respective slides and being connected with said ratio control means, a pair of pinion gears rotatably supported on each of said slides, and adjustor means for simultaneously driving said pinion gears including an adjustor shaft, a pair of adjustor gear means drivable by said adjustor shaft, means connecting said adjustor gear means with said frame, and a sliding drive connection between said adjustor gear means and said pinions for allowing reciprocation of said slide and said pinions.

13. In an angular motion phase generator as defined in claim 1, said adjustable ratio control means including a supporting structure having a guide surfaces disposed in parallel spaced relation, said drive gears having hubs engaged by said guide surfaces, a support member, and linear bearing means mounting said support structure at diametrically opposite locations on said supporting member.

14. In an angular motion phase generator as defined in claim 1, said adjustable ratio control means including a supporting structure having guide surfaces disposed in parallel spaced relation, said drive gears having hubs engaged by said guide surfaces, a support member, and linear bearing means mounting said support structure at diametrically opposite locations on said supporting member, said linear bearing means being in a plane paralleling said drive surfaces.

15. In an angular motion phase generator as defined in claim 14, said linear bearing means including opposed races having rollers alternately revolvable about axes offset 90°.

16. In an infinitely variable change speed transmission, first and second angular motion phase generator means in complementary out-of-phase relationship, power input means for driving said phase generator means, power output means driven by said phase generator means, and means for adjusting said phase generator means in unison to vary the ratio of said transmission, each of said phase generating means comprising a frame, a power input shaft journalled in said frame, a power output shaft, first and second cams in phase with one another and rotatable with said input shaft, adjustable ratio control means reciprocable by said cams and including opposed drive members having oppositely facing parallel drive surfaces at opposite sides of said output shaft, first and second driven gear means in out-of-phase relationship, one way clutch means unidirectionally connecting said gear means to said output shaft for driving the same, said gear means being engaged by said drive surfaces, and said ratio control means including means for angularly adjusting said drive surfaces with respect to said gear means to vary the ratio of input to output motion caused by reciprocation of said ratio control means.

17. In an infinitely variable change speed transmission as defined in claim 16, cam follower means interposed between each of said cam means and said ratio control means, linear bearing means mounting said cam follower means in said frame, and means mounting said ratio control means on said cam follower means for angular adjustment of said ratio control means.

18. In an infinitely variable change speed transmission as defined in claim 16, said frame opposed side walls, said frames being disposed in side-by-side relation with said input shaft extending therebetween and common to both of said phases, bearings supporting said input shaft in said side walls, said output shaft being hollow and disposed about said input shaft, and bearings supporting said output shaft about said input shaft at opposite ends of said output shaft.

19. In an infinitely variable change speed transmission as defined in claim 16, said frame having opposed side walls, said frames being disposed in side-by-side relation with said input shaft extending therebetween and common to both of said phases, bearings supporting said input shaft in said side walls, said output shaft being hollow and disposed about said input shaft, and bearings supporting said output shaft about said input shaft at opposite ends of said output shaft, said output shaft having a central output gear thereon and said first and second driven gear means being disposed on opposite sides of said output gear, and including gear means drivingly connecting the output gear of the respective phases with said power output means.

20. In an infinitely variable change speed transmission as defined in claim 16, said power output means comprising differential gear means drivingly connected with each of said phase generator means and summing the angular motion derived therefrom.

* * * * *